United States Patent [19]

Keller et al.

[11] Patent Number: 5,021,509

[45] Date of Patent: Jun. 4, 1991

[54] BUTYL RUBBER COMPOSITIONS HAVING IMPROVED ADHESION TO POLYESTER

[75] Inventors: Robert C. Keller, Morris Plains, N.J.; Marc R. Kuhnhein, Wadsworth, Ohio

[73] Assignee: Exxon Chemical Patents Inc., Linden, N.J.

[21] Appl. No.: 403,306

[22] Filed: Sep. 1, 1989

[51] Int. Cl.$^5$ .................. C08L 9/00; C08L 15/02; C08L 33/02; C08L 33/06; C08L 23/08

[52] U.S. Cl. .................................. 525/221; 525/227; 525/195; 525/193

[58] Field of Search .................. 525/227, 221, 195

[56] References Cited

U.S. PATENT DOCUMENTS

| | | | |
|---|---|---|---|
| 2,356,128 | 8/1944 | Thomas et al. | 260/79 |
| 2,356,129 | 8/1944 | Sparks et al. | 260/79 |
| 2,940,960 | 6/1960 | Tegge et al. | 260/85.3 |
| 3,023,191 | 2/1962 | Tegge et al. | 260/73 |
| 3,036,948 | 5/1962 | Danielson | 156/330 |
| 3,099,644 | 7/1963 | Parker et al. | 260/85.3 |
| 3,350,372 | 10/1967 | Anspon et al. | 260/86.7 |
| 3,449,200 | 6/1969 | Kalafus et al. | 161/92 |
| 4,500,681 | 2/1985 | Shulman | 525/227 |
| 4,508,592 | 4/1985 | Kowalski | 159/2.1 |
| 4,513,116 | 4/1985 | Kowalski et al. | 525/53 |
| 4,548,995 | 10/1985 | Kowalski et al. | 525/354 |
| 4,554,326 | 11/1985 | Kowalski et al. | 525/354 |
| 4,639,487 | 1/1987 | Hazelton et al. | 525/227 |
| 4,804,577 | 2/1989 | Hazelton et al. | 525/227 |
| 4,851,468 | 7/1989 | Hazelton et al. | 525/227 |

FOREIGN PATENT DOCUMENTS 56-047441  4/1981  Japan .

OTHER PUBLICATIONS

*Synthetic Rubber*, by G. S. Whitby (1954 edition by John Wiley and Sons, Inc.), pp. 838-891.
*Encyclopedia of Polymer Science and Engineering*, vol. 8, Second edition, 1987 (John Wiley and Sons), pp. 435-436.

*Primary Examiner*—Carman J. Seccuro
*Attorney, Agent, or Firm*—W. G. Muller

[57] ABSTRACT

The present invention provides for an improved butyl rubber composition which exhibits improved adhesion to pre-treated polyester textile materials, while at the same time important physical properties of cured butyl rubber such as modulus, tensile strength and elongation are maintained or even enhanced. The vulcanizable composition of the invention is based on a blend of butyl rubber and minor amounts of a copolymer of ethylene with a lower alkyl acrylate or methacrylate, or a terpolymer of ethylene, a lower alkyl acrylate or methacrylate and acrylic or methacrylic acid. The composition of this invention exhibits improved adhesion to pre-treated polyester textile materials.

The invention also relates to laminates of the butyl rubber compositions of this invention with polyester textile materials such as yarns and woven fabrics.

18 Claims, No Drawings

BUTYL RUBBER COMPOSITIONS HAVING IMPROVED ADHESION TO POLYESTER

BACKGROUND OF THE INVENTION

1. Field of the Invention

This invention relates to butyl rubber compositions exhibiting improved adhesion to polyester textile materials.

2. Description of Related Art

Polyester textiles have long been used as reinforcing agents for rubber articles such as pneumatic tires, hoses, V-belts, air springs and the like. As used in the description of the invention following the term "polyester textile" or "polyester textile material" refers to any filament, fiber thread, yarn, cord, cable, woven fabric, nonwoven fabric, knit fabric or the like, fabricated in whole or part from a synthetic, high molecular-weight polymer in which the major portion by weight has been derived from the condensation of a polybasic acid and a polyhydric alcohol which has a high degree of modulus and tensile strength and imparts to manufactured rubber articles in which it is incorporated, form and structure and/or a high degree of strength, toughness and durability. The polyester polymers normally employed in textiles are derived from the condensation of an aromatic acid, usually a phthalic acid or a low molecular weight diester thereof, and a low molecular weight glycol, such as ethylene glycol or 1,4-dimethylol cyclohexane. A particularly preferred polyester textile is polyethylene terephthalate because of the many desirable properties it imparts to textiles such as high modulus and tensile strength, high melting point, resistance to flexing, dimensional stability and resistance to degradation and loss of properties upon exposure to environmental conditions of use.

However, in spite of the foregoing numerous advantages of polyester textile, their use as a reinforcement for rubber articles such as pneumatic tires, belts, hose, air springs, and the like has been seriously impeded because the adhesion of polyester textile to elastomers is, in general, very poor. Apparently the polyester textile is so inert chemically, compared to rayon and nylon which contain many more reactive groups in their chains, that there is little or no tendency for the polyester textile to form a strong adhesive chemical bond with elastomers when the usual adhesives are used. The problem of adequate adhesion of polyester textile is especially important in the case of butyl rubber, which has many desirable characteristics that would enable composite articles made of butyl rubber, reinforced with polyester textile, to serve many purposes in an improved manner.

An especially important application for reinforced butyl rubber (isobutylene-isoprene copolymer rubber) and particularly halogenated butyl rubber, is in the construction of hoses and tubing for use in automotive and air conditioning applications. Butyl rubber has outstanding impermeability to water vapor and many organic solvents, including fluorinated hydrocarbons, with which it comes into contact. This property renders polyester textile-reinforced butyl rubber an ideal candidate for applications such as water hoses, hydraulic brake lines, air-conditioning hoses and the like.

Numerous approaches have been taken in the prior art to improve the adhesion of polyester textile to elastomers such as butyl rubber. U.S. Pat. No. 2,561,215 discloses coating the textile with a rubber latex containing a resorcinol/formaldehyde type adhesive or adhesives based on copolymers containing vinyl pyridine or pyrrolidones. According to U.S. Pat. No. 3,036,948, polyester textiles treated with epoxy resins exhibit improved adhesion to butyl rubber which contains 2,2'-methylene-bis-(4-chloro-6-methylolphenol) as a curing auxiliary. Adhesion of polyester textile to elastomers is enhanced according to U.S. Pat. No. 3,449,200 by first coating the textile with a composition based on a mixture of an aldehyde type resin and a polyethylenimine.

While these and other techniques for improving adhesion have proven successful to varying degrees, there is a need in the art for improved approaches to solving the adhesion problem which are more simple, which do not require the use of noxious chemicals or elastomer additives which may detract from the physical and chemical properties of the cured rubber, and which provide for enhanced adhesion.

SUMMARY OF THE INVENTION

The present invention provides for an improved butyl rubber composition which exhibits improved adhesion to pre-treated polyester textile materials, while at the same time important physical properties of cured butyl rubber such as modulus, tensile strength and elongation are maintained or even enhanced. The vulcanizable composition of the invention is based on a blend of butyl rubber and minor amounts of a copolymer of ethylene with a lower alkyl acrylate or methacrylate, or a terpolymer of ethylene, a lower alkyl acrylate or methacrylate and acrylic or methacrylic acid. The composition of this invention exhibits improved adhesion to pre-treated polyester textile materials.

The invention also relates to laminates of the butyl rubber compositions of this invention with polyester textile materials such as yarns and woven fabrics.

DETAILED DESCRIPTION OF THE INVENTION

The elastomer employed in the compositions of this invention may be butyl rubber, a chloriated or brominated butyl rubber, or a mixed chloro/bromo butyl rubber.

Butyl rubber is a copolymer of an isoolefin and a conjugated multiolefin. The useful copolymers comprise a major portion of isoolefin and a minor amount, preferably not more than 30wt.%, of a conjugated multiolefin. The preferred copolymers comprise about 85–99.5 wt% (preferably 95–99.5 wt.%) of a $C_4$ to $C_7$ isoolefin, such as isobutylene, and about 15–0.5 wt.% (preferably about 5–0.5 wt.%) of a multiolefin of about 4–14 carbon atoms. These copolymers are referred to in the patents and literature as "butyl rubber"; see, for example, the textbook Synthetic Rubber by G. S. Whitby (1954 edition by John Wiley and Sons, Inc.), pages 838–891, etc. The term "butyl rubber" as used in the specification and claims includes the aforementioned copolymers of an isoolefin having 4–7 carbon atoms and about 0.5 to 20 wt.% of a conjugated multiolefin of about 4–10 carbon atoms, as well as halogenated versions thereof. Preferably these copolymers contain about 0.5 to about 5% conjugated multiolefin. The preferred isoolefin is isobutylene. Suitable conjugated multiolefins include isoprene, butadiene, dimethyl butadiene, piperylene, etc.

Commercial butyl rubber is typically a copolymer of isobutylene and a minor amount of isoprene. It is generally prepared in a slurry process using methyl chloride as a vehicle and a Friedel-Crafts catalyst as the polymerization initiator. The methyl chloride offers the advantage that AlCl$_3$, a relatively inexpensive Friedel-Crafts catalyst, is soluble in it as are the isobutylene and isoprene comonomers. Additionally, the butyl rubber polymer is insoluble in the methyl chloride and precipitates out of solution as fine particles. The polymerization is generally carried out at temperatures of about 90 to 100° C. See U.S. Pat. Nos. 2,356,128 and 2,356,129 incorporated herein by reference.

A typical continuous polymerization process is carried out in a draft tube reactor. Monomer feed and catalyst are continuously introduced at bottom of the draft tube where an axial flow pump is located. The pump circulates the slurry at high velocity to provide efficient mixing and heat transfer. Polymer slurry containing about 20-30 wt.% butyl rubber continuously overflows from the reactor through a transfer line.

Conventional high molecular weight butyl rubber generally has a number average molecular weight of about 25,000 to about 500,000 preferably about 80,000 to about 300,000 especially about 100,000 to about 250,000. Low molecular weight polymers have also been prepared with number average molecular weights of from 5,000 to 25,000.

A solution of the butyl rubber is then prepared for the halogenation of the butyl rubber. Any halogenation technique may be utilized. In the preferred method of halogenation a "solvent replacement" process is utilized to replace the methyl chloride solvent. Cold butyl rubber slurry in methyl chloride from the polymerization reactor is passed to an agitated solution in a drum containing a liquid hydrocarbon solvent such as hexane. Hot hexane vapors are introduced to flash overhead the methyl chloride diluent and unreacted monomers. Dissolution of the fine slurry particles occurs rapidly. The resulting solution is stripped to remove traces of methyl chloride and monomers, and brought to the desired concentration for halogenation by flashing. Hexane recovered from the flash concentration step is condensed and returned to the solution drum.

The butyl rubber in solution is contacted with chlorine or bromine in a series of high-intensity mixing stages. Elemental halogen is present up to a maximum of about 1:1 molar ratio with enchained isoprene in the butyl feedstock. Hydrogen chloride or hydrogen bromide is generated during the halogenation step and must be neutralized in a subsequent step. The halogenated polymer in solution is contacted with steam and water in multiple vessels in order to vaporize the solvent and produce a slurry of halogenated butyl in water. The stripped slurry is finished using extrusion drying techniques well known in the art. Extrusion temperature must be kept low to prevent dehydrohalogenation and this is preferably achieved using gas injection into the drying extruder, as described in detail in U.S. Pat. No. 4,508,592, incorporated herein by reference. For a detailed description of the halogenation process see U.S. Pat. Nos. 3,023,191; 2,940,960 and 3,099,644 as well as Encyclopedia of Polymer Science and Engineering, Volume 8, Second Ed. 1987 (John Wiley & Sons) pp 435-436, which describes a continuous chlorination process, all of which are incorporated herein by reference.

Most recently, a process has been described for preparing halogenated butyl rubber in the melt phase using, e.g., an extrusion process. Details of the chlorination and/or bromination of butyl rubber by means of such a process is described in detail in U.S. Pat. No. 4,513,116; 4,548,995; and 4,554,326 incorporated herein by reference. In a preferred embodiment of such process, butyl rubber is fed to an extruder at a controlled rate such that the reaction zone is not completely filled with rubber. A halogenation agent is fed to the temperature controlled reaction zone, preferably at a temperature of less than about 170° C. and an inert gas is injected at a point downstream of the reaction to sweep by-products and unreacted halogenating agent out of a vent. The halogenated product is stabilized, extruded from the extruder and cooled. Some molecular weight degradation is known to occur in both solution and extrusion processes, though the number average molecular weight of the preferred halobutyl rubber will be generally of the ranges indicated above for the butyl rubber.

The ethylene polymers which are added to the butyl rubber formulation of this invention are random copolymers or terpolymers comprising from about 60 to about 96% by weight of polymerized ethylene, from about 4 to about 30% by weight of a polymerized $C_1$ to $C_4$ alkyl acrylate or methacrylate, and from 0 to about 10% by weight of polymerized acrylic or methacrylic acid. More preferred copolymers contain from about 75 to about 95% by weight ethylene and from about 5 to about 25% by weight $C_1$ to $C_4$ alkyl acrylate or methacrylate. Where the ethylene polymer is a terpolymer, it also contains at least about 0.5% by weight of polymerized acrylic or methacrylic acid more preferably at least about 3% by weight and most preferably from about 4.5 to about 8% by weight. The term "terpolymer" as used herein is intended to refer to true interpolymers of ethylene and the acrylate and acid monomers as well as blends of separate copolymers of ethylene and acrylate monomers with copolymers of ethylene and acid monomers, with the proviso that the relative polymerized monomer contents of such blends are as described above.

The preferred $C_1$ to $C_4$ acrylate component of the ethylene polymers is methyl acrylate and the preferred acid component of the ethylene terpolymers is acrylic acid.

The ethylene polymers may comprise a wide range of melt indices generally between about 0.1 to about 130, more preferably from about 1 to about 30 and most preferably from about 2.5 to about 10 dg/min as determined by ASTM method D-3835.

The ethylene copolymers and terpolymers may be produced by any one of a number of well-known free radical initiated processes such as, for example, those described in U.S. Pat. No. 3,350,372 which is incorporated herein by reference for all purposes as if fully set forth. Generally ethylene, the (meth)acrylate and/or the (meth)acrylic acids are metered into, for example, a high pressure autoclave reactor along with any one of a number of well-known free radical polymerization initiators (catalysts) suitable for producing ethylene and acrylic based polymers.

Particularly preferred catalysts include organic peroxides such as, for example, lauroyl peroxide, di-tert butyl peroxide, tert butyl peroxide and various azo compounds. Typically, the catalyst will be dissolved in a suitable organic liquid such as benzene, mineral oil, or the like. Ordinarily the catalyst is used at a level of between about 50 to about 20,000, more preferably between about 100 to about 250, ppm based on the weight of monomers.

The amount of ethylene polymer added to the butyl rubber required for adhesion promotion properties may vary depending upon the degree of adhesion promotion desired. Generally from about 0.5 to about 15% by weight based on the total rubber content of the composition is sufficient. The preferred level of addition is from about 1 to about 10% by weight based on the rubber content of the composition.

The vulcanizable butyl rubber composition of the invention also includes a conventional vulcanizing system for this type of rubber. Generally such systems include a metal oxide such as zinc oxide, magnesium oxide or mixtures thereof, and an organic peroxide such as dicumyl and/or benzoyl peroxide. The composition may also include sulfur or sulfur-containing compounds as curing adjuncts or accelerators. Examples of such compounds are benzothiazyl disulfide, N-oxydiethylene benzothiazole-2-sulfenamide, 2-mercaptobenzothiazole, tellurium diethyl-dithiocarbomate, tetramethylthiuram disulfide, M-phenylene bis maleiimide, 2-mercapto-4,5-methyl-benzimidazole and salts thereof.

The vulcanizable composition may also contain other conventional additives known in the art including fillers such as carbon black or silica, stabilizers, antioxidants, plasticizers, processing oils, pigments, flame retardants, blowing agents and like additives.

The vulcanizable composition may be prepared and blended on any suitable mixing device such as an internal mixer (Brabender Plasticorder), a Banbury Mixer, a kneader or a similar mixing device. Blending temperatures and times may range about 45 to 180° C. and from about 4 to 10 minutes respectively. After forming a homogeneous melt mixture of the butyl rubber, the ethylene polymer and the optional fillers, processing aids, antioxidants and the like, the mixture is then prepared for vulcanization by the further mixing-in of crosslinking agents and accelerators on an apparatus such as a two roll mill, after which the mixture is sheeted out as is known in the art.

The assembly of polyester textile material described above and curable butyl rubber stock as prepared above may be made in an suitable manner, depending on the particular article to be constructed. One or more sheets of the curable rubber stock may be laminated to surfaces of polyester textile, in woven or non-woven form. The curable rubber stock may also be calendered or otherwise applied directly onto one or both surfaces of the polyester fabric, whether a woven fabric or a cord fabric such as tire cord fabric. One or more layers of such calendered fabric may be plied up to make the desired article. Alternatively sheets or other shapes of the vulcanizable rubber stock, prepared by calendering, milling, pre-molding, extrusion, etc., may be applied to the fabric or conversely, the fabric may be applied to one or more surfaces of the rubber body.

Because the fiber surface of polyester textile materials is highly hydophobic, it is preferred to treat the surface with a material which renders the surface less hydrophobic and thus more adherable to the butyl rubber composition. Such pre-treatment may include coating the fiber with a thermoset acrylic resin such as a copolymer of methyl methacrylate, ethyl acrylate and methacrylamide which also contains a urea or melamine crosslinking resin, or other polymeric substances. The preferred pre-treatment involves applying a coating of a polyisocyante such as polymethylene polyisocyanate to the surface of the fiber, followed by drying to remove the solvent. The coating may be applied by any suitable technique such as dip coating, roller coating, spraying and the like. For many applications it is desirable to heat set or stretch the polyester textile prior to contacting it with the curable butyl rubber stock in order to minimize textile stretching and obtain a textile-reinforced rubber product having maximum dimensional stability and durability in service. This may be accomplished by heat stretching the textile concurrently with the coating and drying operation. With the preferred polyethylene terephthalate type of polyester textile, there may be normally employed a stretching time of about 20 to 60 seconds at temperatures ranging from about 380° to 480° F.

After assembly, the polyester fabric-butyl rubber combination is then subjected to conventional vulcanizing conditions, usually while confined in a mold under pressure, usually at a temperature of from about 125° C. to about 200° C. The time required to substantially complete the cure of the butyl rubber portion of the laminate will vary widely in practice, depending on such variables as the quantity of the curing agent employed, the temperature at which the process is carried out, the size of the article being cured, the type of apparatus employed, the exact qualities desired in the final vulcanizate, etc. In general, it may be stated that satisfactory curing times almost invariably fall within the range from about 2 minutes to 8 hours. It will be understood that the time required will in general be inversely related to the quantity of the vulcanizing agent contained in the mixture, and will also be inversely related to the temperature existing during the cure. Those skilled in the art will readily be able to determine suitable vulcanizing conditions to suit particular purposes in accordance with conventional practice.

The following examples are illustrative of the invention. In these examples, the butyl rubber employed is a brominated copolymer of isobutylene and isoprene having a Mooney viscosity of 27 to 37 at 1 + 8, 125° C. and a bromine content of about 2% by weight. The material is commercially available from Exxon Chemical Corporation under the trade designation "Bromobutyl 222".

EXAMPLE 1

In an internal mixer (Banbury Intensive Mixer) were charged bromobutyl rubber, carbon black, magnesium oxide, naphthenic oil, stearic acid and polyoxyethylene ether in the quantities as set forth in Table 1 under Example 1. The temperature of the mixer was maintained at 100 to 140° C. and mixing continued for a period of about 5 minutes. This intensive mixing includes kneading, shearing and cross-over blending. The uniform mixture was discharged from the Banbury and placed on a two roll mill and milled at a temperature of 30-45° C. The zinc oxide, dicumyl peroxide and maleiimide curing system in the quantities shown in Table were then added to the plastic rubber mass and milling was continued at about 40° C. for about 15 minutes.

The milled elastomer composition was then sheeted off the mill at a thickness of about 0.13 inch.

The sheeted rubber as prepared above was then assembled with polyester yarn by first wrapping the rubber sheet around a mandrel to form a cylinder. A 1000 denier, 2 filament wound polyester yarn was then tightly and continuously wound around the sheet from top to bottom such that the filaments were adjacent to one another much akin to the wire windings in an electric motor, and were embedded into the soft rubber mass. The yarn employed was a material commercially available from the Bibb Company of Porterdale Ga. under the trade name "Esterweld" and consists of polyethylene terephthalate yarn which has been coated with a polyisocyanate and heat stretched as described above.

A second sheet of rubber stock as prepared above was then placed and pressed over the yarn wrapping to form a sandwich structure approximately ¼ inch thick.

The assembled cylinder structure was then removed from the mandrel, opened to form a flat sheet, placed in a press and vulcanized at 160° C. for 30 minutes.

Adhesion of the yarn to the cured rubber composition was evaluated using an "INSTRON" testing machine. One inch wide strips of the cured sheet assembly were cut and rubber sheet tabs from each face of the assembly were mounted on separate jaws of the Instron Machine. The strip was subjected to a 180° pull and the force required to separate the rubber from the yarn was recorded in lbs per inch.

Physical property data and adhesive strength for this laminate are recorded in Table 1 under Example 1.

EXAMPLE 2

The process of Example 1 was repeated except that pellets of the adhesion promoting ethylene polymer of this invention were added to the Banbury mix at the time the bromobutyl rubber was added. The ethylene polymer employed in this Example was a terpolymer of 75% by weight ethylene, 20% by weight of methyl acrylate and 5% by weight of acrylic acid. The mixture was compounded, sheeted, wrapped with yarn, cured and tested as set forth in Example 1. The composition of this Example and test results are as shown in Table 1 under Example 2.

EXAMPLES 3–6

Four additional formulations were prepared, assembled and tested as set forth in Example 1. The composition of these formulations and test results are as set forth in Table 1 under Examples 3–6. Examples 4 and 6 contain the same ethylene polymer as Example 2.

As can be seen by comparing the data for Examples 1 and 2, the inclusion into the rubber formulation of 5 parts by weight of the ethylene polymer of this invention in Example 2 in combination with a zinc oxide, peroxide and m-phenylene-bismaleimide curing system increases adhesion to the polyester yarn by a factor of 75% as compared with Example 1 which does not contain the ethylene polymer. In addition there is no adverse effect on the physical properties of the cured rubber.

The data associated with Examples 3–6 shows better than a two-fold increase in adhesion to polyester yarn (Examples 4 and 6 as compared with Examples 3 and 5) when the ethylene polymer of this invention is included in butyl rubber compositions containing various cure systems.

TABLE 1

|  | Ex. 1 | Ex. 2 | Ex. 3 | Ex. 4 | Ex. 5 | Ex. 6 |
| --- | --- | --- | --- | --- | --- | --- |
| Bromobutyl rubber | 100 | 100 | 100 | 100 | 100 | 100 |
| Furnace Carbon Black | 55 | 55 | 55 | 55 | 55 | 55 |
| Magnesium oxide | 1.0 | 1.0 | 1.0 | 1.0 | 1.0 | 1.0 |
| Naphthenic oil | 5.0 | 5.0 | 5.0 | 5.0 | 5.0 | 5.0 |
| Stearic Acid | 1.0 | 1.0 | 1.0 | 1.0 | 1.0 | 1.0 |
| Carbowax 3350[1] | 1.5 | 1.5 | 1.5 | 1.5 | 1.5 | 1.5 |
| Zinc oxide | 3.0 | 3.0 | 3.0 | 3.0 | — | — |
| Dicumyl Peroxide | 2.0 | 2.0 | — | — | — | — |
| m-phenylene-bis-maleimide | 1.0 | 1.0 | — | — | 1.5 | 1.5 |
| mercaptobenzothiazole | — | — | 2.0 | 2.0 | — | — |
| tetramethyl thiuram disulfide | — | — | 1.0 | 1.0 | — | — |
| Vulkanox MB-2[2] | — | — | — | — | 1.0 | 1.0 |
| Ethylene polymer | — | 5 | — | 5 | — | 5 |
| PRESS CURE AT 30 minutes/160° C. | | | | | | |
| Hardness, Shore A (ASTM D-2240) | 55 | 62 | 50 | 60 | 57 | 57 |
| 100% Modulus (ASTM D-412) | 2.4 | 2.7 | 1.4 | 1.8 | 2.9 | 4.2 |
| 200% Modulus (ASTM D-412) | 6.9 | 6.6 | 3.7 | 4.1 | 7.2 | 9.4 |
| Tensile Str, mPA (ASTM D-412) | 8.3 | 8.3 | 11.5 | 10.6 | 10.5 | 11.4 |
| Elongation % (ASTM D-412) | 230 | 240 | 575 | 610 | 315 | 270 |
| ADHESION TO YARN | | | | | | |
| LBS per inch. | 7.0 | 12.3 | 2.8 | 8.0 | 3.0 | 6.5 |

Notes
[1] Polyoxyethylene ether, Mw 3300
[2] Zinc salt of 2-mercapto-4,5-methyl benzimidazole

EXAMPLES 7–14

Eight additional rubber compositions were prepared, all based on the identical rubber masterbatch formulation as follows:

| Bromobutyl rubber | 100 parts by weight |
| --- | --- |
| Furnace Carbon black | 55 parts by weight |
| Magnesium oxide | 1.0 parts by weight |
| Naphthenic process oil | 5.0 parts by weight |
| Stearic Acid | 1.0 parts by weight |
| Carbowax 3350 | 1.5 parts by weight |
| Dicumyl peroxide | 2.0 parts by weight |
| m-phenylene-bis-maleimide | 1.0 parts by weight |
| TOTAL | 166.5 |

These formulations contained varying amounts of the ethylene polymers of this invention are shown in Table 2. Example 7 is a control containing no ethylene polymer. The composition of the ethylene terpolymers used in Examples 8–12 is shown in the Table, with E signifying ethylene, MA signifying methyl acrylate and A signifying acrylic acid. In Examples 13 and 14, copolymers consisting of ethylene and methyl acrylate were These formulations were compounded, sheeted, wrapped with yarn, cured and tested as set forth in Examples 1 and 2. The compositions and test results are set forth in Table 2.

As can be seen from a comparison of the data, the inclusion of the ethylene terpolymers and copolymers of this invention into

TABLE 2

|  | Ex. 7 | Ex. 8 | Ex. 9 | Ex. 10 | Ex. 11 | Ex. 12 | Ex. 13 | Ex. 14 |
|---|---|---|---|---|---|---|---|---|
| Rubber Master Batch | 166.5 | 166.5 | 166.5 | 166.5 | 166.5 | 166.5 | 166.5 | 166.5 |
| Ethylene Polymer |  |  |  |  |  |  |  |  |
| Melt Index | 2.5 | 2.5 | 2.5 | 2.5 | 15 | 6 | 6 | 130 |
| E/MA/AA Content | 75/20/5 | 75/20/5 | 75/20/5 | 75/20/5 | 75/20/5 | 88/16/6 | 94/6/0 | 80/20/0 |
| Parts per 100 parts rubber | 0 | 5 | 10 | 5 | 5 | 5 | 5 | 5 |
| Press Cure At 30 min. at 160° C. |  |  |  |  |  |  |  |  |
| Hardness, Shore A | 52 | 58 | 63 | 58 | 60 | 60 | 56 | 56 |
| 100% Modulus, MPa | 1.6 | 2.1 | 2.6 | 2.1 | 2.1 | 2.3 | 2.2 | 1.9 |
| 300% Modulus, MPa | 8.7 | 8.4 | 8.7 | 8.4 | 8.2 | 8.5 | — | 8.0 |
| Tensile Strength, MPa | 8.9 | 8.5 | 8.7 | 8.5 | 8.2 | 8.5 | 8.6 | 8.0 |
| Elongation, % | 310 | 315 | 300 | 315 | 300 | 300 | 295 | 305 |
| Adhesion To Yarn |  |  |  |  |  |  |  |  |
| LBS per inch | 15.3 | 22.5 | 22.5 | 22.5 | 22.5 | 20.0 | 19.0 | 22.2 | the rubber formulations gives rise to a marked increase in adhesion to polyester yarn as compared with control Example 7.

It is to be understood that the above described embodiments of the invention are illustrative only and that modifications throughout may occur to those skilled in the art. Accordingly, this invention is not to be regarded as limited to the embodiments disclosed herein, but is to be limited as defined by the appended claims.

What is claimed is:

1. A vulcanizable composition comprising an admixture of:
   (a) an elastomer selected from the group consisting of butyl rubber and halogenated butyl rubber, and
   (b) an adhesion promoter comprising a terpolymer of from about 60 to about 96% by weight of polymerized ethylene, from about 4 to about 30% by weight of a polymerized $C_1$ to $C_4$ alkyl acrylate or methacrylate, and from about 0.5 to about 10% by weight of polymerized acrylic or methacrylic acid, said adhesion promoter being present at a level of from about 0.5 to about 15% by weight based on the rubber content of the composition.

2. The composition of claim 1 wherein said adhesion promoter contains from about 0.5 to about 8% by weight of polymerized acrylic or methacrylic acid.

3. The composition of claim 1 wherein said alkyl acrylate is methyl acrylate.

4. The composition of claim 2 wherein said acid is acrylic acid.

5. The composition of claim 2 wherein said adhesion promoter comprises a terpolymer containing from about 5 to about 25% by weight of polymerized acrylate and from about 3 to about 8% by weight of polymerized acrylic or methacrylic acid.

6. The composition of claim 1 wherein said elastomer is brominated butyl rubber.

7. The composition of claim 6 wherein said adhesion promoter is present at a level of from about 1 to about 10% by weight based on the rubber content of the composition.

8. The composition of claim 1 further containing an effective amount of a vulcanizing system.

9. A vulcanized composition prepared by heating the composition of claim 8 for a time and at a temperature sufficient to vulcanize said compositions.

10. A vulcanizable composition consisting essentially of an admixture of polymers consisting of:
    (a) an elastomer selected from the group consisting of butyl rubber and halogenated butyl rubber, and
    (b) an adhesion promoter comprising a copolymer of from about 75 to about 95% by weight of polymerized ethylene and from about 5 to about 25% by weight of a polymerized $C_1$ to $C_4$ alkyl acrylate or methacrylate, said adhesion promoter being present at a level of from about 0.5 to about 15% by weight based on the rubber content of the composition.

11. The composition of claim 10 wherein said alkylacrylate is methyl acrylate.

12. The composition of claim 10 wherein said elastomer is brominated butyl rubber.

13. The composition of claim 10 wherein said adhesion promoter is present at a level of from about 1 to about 10% by weight based on the rubber content of the composition.

14. The composition of claim 10 further containing an effective amount of a vulcanizing system.

15. A vulcanized composition prepared by heating the composition of claim 14 for a time and at a temperature sufficient to vulcanize said compositions.

16. A process for enhancing the adhesive properties of curable elastomers selected from the group consisting of butyl rubber and halogenated butyl rubber to other substrates comprising admixing with said elastomer an adhesion promoter comprising a terpolymer of from about 60 to about 96% by weight of polymerized ethylene, from about 4 to about 30% by weight of a polymerized $C_1$ to $C_4$ alkyl acrylate or methacrylate, and from about 0.5 to about 10% by weight of polymerized acrylic or methacrylic acid, said adhesion promoter being admixed at a level of from about 0.5 to about 15% by weight based on the rubber content of the composition.

17. The composition of claim 16 wherein said acid is acrylic acid.

18. The composition of claim 16 wherein said alkyl acrylate is methyl acrylate.

* * * * *